United States Patent
Kleppin et al.

(10) Patent No.: US 11,991,133 B2
(45) Date of Patent: May 21, 2024

(54) REAL-TIME MESSAGE MODERATION

(71) Applicant: DISCORD INC., San Francisco, CA (US)

(72) Inventors: Mathew Kleppin, Charlotte, NC (US); Hemagiri Arumugam, Hagerstown, MD (US)

(73) Assignee: DISCORD INC., San Francisco, CA (US)

( * ) Notice: Subject to any disclaimer, the term of this patent is extended or adjusted under 35 U.S.C. 154(b) by 0 days.

(21) Appl. No.: 17/935,683

(22) Filed: Sep. 27, 2022

(65) Prior Publication Data

US 2024/0106781 A1   Mar. 28, 2024

(51) Int. Cl.
   *G06F 15/16* (2006.01)
   *H04L 51/04* (2022.01)
   *H04L 51/212* (2022.01)
   *H04L 51/52* (2022.01)

(52) U.S. Cl.
   CPC ............ *H04L 51/212* (2022.05); *H04L 51/04* (2013.01); *H04L 51/52* (2022.05)

(58) Field of Classification Search
   CPC ....... H04L 51/212; H04L 51/52; H04L 51/04; H04L 51/56
   USPC ........ 709/204, 205, 206, 207, 217, 218, 225
   See application file for complete search history.

(56) References Cited

U.S. PATENT DOCUMENTS

| | | | | |
|---|---|---|---|---|
| 5,678,007 A | * | 10/1997 | Hurvig | H04L 67/01 709/227 |
| 7,505,759 B1 | * | 3/2009 | Rahman | H04L 51/214 455/412.2 |
| 7,958,159 B1 | * | 6/2011 | Tran | G06F 16/24564 707/634 |
| 8,355,919 B2 | * | 1/2013 | Silverman | G10L 13/08 704/260 |
| 2003/0229673 A1 | * | 12/2003 | Malik | H04L 69/22 709/207 |
| 2006/0129381 A1 | * | 6/2006 | Wakita | G06F 40/45 704/9 |
| 2010/0228549 A1 | * | 9/2010 | Herman | G06F 17/289 704/260 |
| 2011/0055334 A1 | * | 3/2011 | Tivyan | H04L 51/23 709/206 |
| 2014/0059135 A1 | * | 2/2014 | Stan | G06F 40/237 709/204 |
| 2016/0036842 A1 | * | 2/2016 | Lee | H04L 63/123 726/4 |
| 2020/0053121 A1 | * | 2/2020 | Wilcox | G06F 40/205 |
| 2022/0377035 A1 | * | 11/2022 | Shapiro | H04L 51/063 |

\* cited by examiner

*Primary Examiner* — Kaylee J Huang
(74) *Attorney, Agent, or Firm* — Polsinelli PC

(57) ABSTRACT

The present technology provides real-time message moderation that checks messages against a list of trigger checks and determines whether or not the message should be blocked before the message is sent to other members of the community. The real-time message moderation uses a rules system that enables administrators to generate a customized sets of rules, such as custom keyword filter that blocks a message if it contains a word that matches a keyword associated with the custom keyword filter rule, and wherein custom keywords may be added by a moderator of the server. Moderators can report issues with past blocked messages to train a machine-learning model about a bad flag.

20 Claims, 10 Drawing Sheets

600

| Rule Name |
| --- |
| Foods That Cause Discord |

Choose your words

| fluffer nutter, peepza, pineapple pizza, mint ice cream, smile fries, smiley fries, peanut butter pickle, snickle, deep fried wumpus, hot dog, sandwich* |
| --- |

(use * at beginning or end for partial matches)

Choose a response

| | |
|---|---|
| Block Message | [X] |
| Send an Alert | [X] |
| Timeout User | [ ] |

Add exempt rules or channels (optional)

[#plantmods X]  [@gardeners X]

FIG. 6A

REAL-TIME MESSAGE MODERATION

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. Some social networks have moderators that moderate the content in their respective social networks or online communities. While social networks can provide entertainment, networking, commercial, or informational value, they are also subject to various challenges. With the moderators generally being humans who do not have the ability to constantly monitor what is being said, it is possible that the moderators are not able to catch all messages that may not follow their respective community guidelines.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 6A illustrates an example of a user interface presenting a custom rule generation interface in accordance with one embodiment.

DETAILED DESCRIPTION

Figure 1:
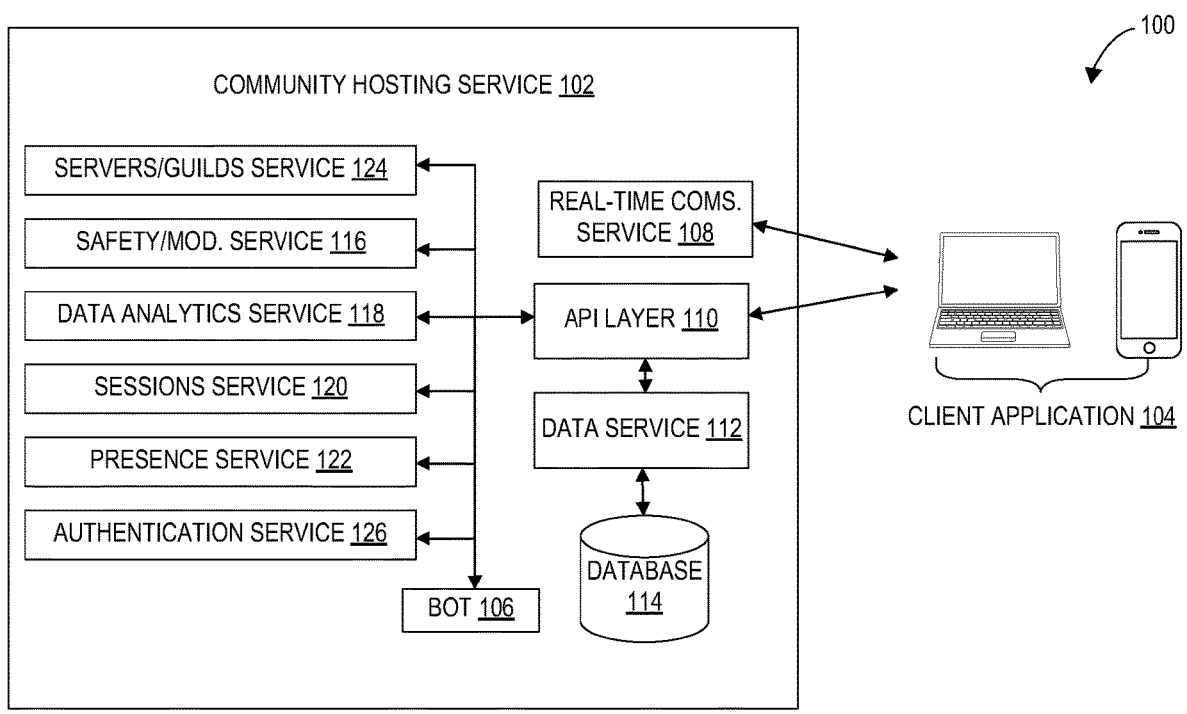
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for real-time message moderation in online community hosting environments. As mentioned above, one of the issues that community moderators or administrators have is that they are not able to provide constant and reliable real-time message moderation. Moderation is a repetitive and time-consuming task that often requires administrators to read a majority of the communications sent in a community. Administrators in large communities can spend most of their day monitoring messages and performing repetitive actions instead of enjoying their community. This issue also introduces a lot of burden for smaller communities that are growing, who have to find reliable administrators to do this work.

As described herein, one aspect of the present technology is to provide real-time message moderation that checks messages against a list of trigger checks and determines whether or not the message should be blocked before the message is sent to other members of the community. The real-time message moderation may use a rules system that enables administrators to generate customized sets of rules, which automate a lot of the repetitive moderation work and may be specific to a particular server. For example, one of the rules may be a custom keyword filter that blocks a message if it contains a word that matches a keyword associated with the custom keyword filter, and wherein custom keywords may be added by a moderator of the server. Furthermore, moderators can report issues with past blocked messages to train a machine-learning model about a bad classification.

The present disclosure contemplates that one of the challenges in creating a real-time filtering system for chat is that the system needs to strike a balance between capturing words that have been typed in a way that is purposefully trying to avoid filters versus words that may not intend to relay prohibited content. The balance captured by the present technology includes running text normalization on the message while removing or replacing certain Unicode characters that are used to evade keyword filters without introducing too many false positives.

Although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or sub-topics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bots 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on client application 104 or the computing device hosting client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

FIG. 1 also illustrates a bot 106. The bot 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bots 106 can have their own user account and are authenticated using a token. Bots 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
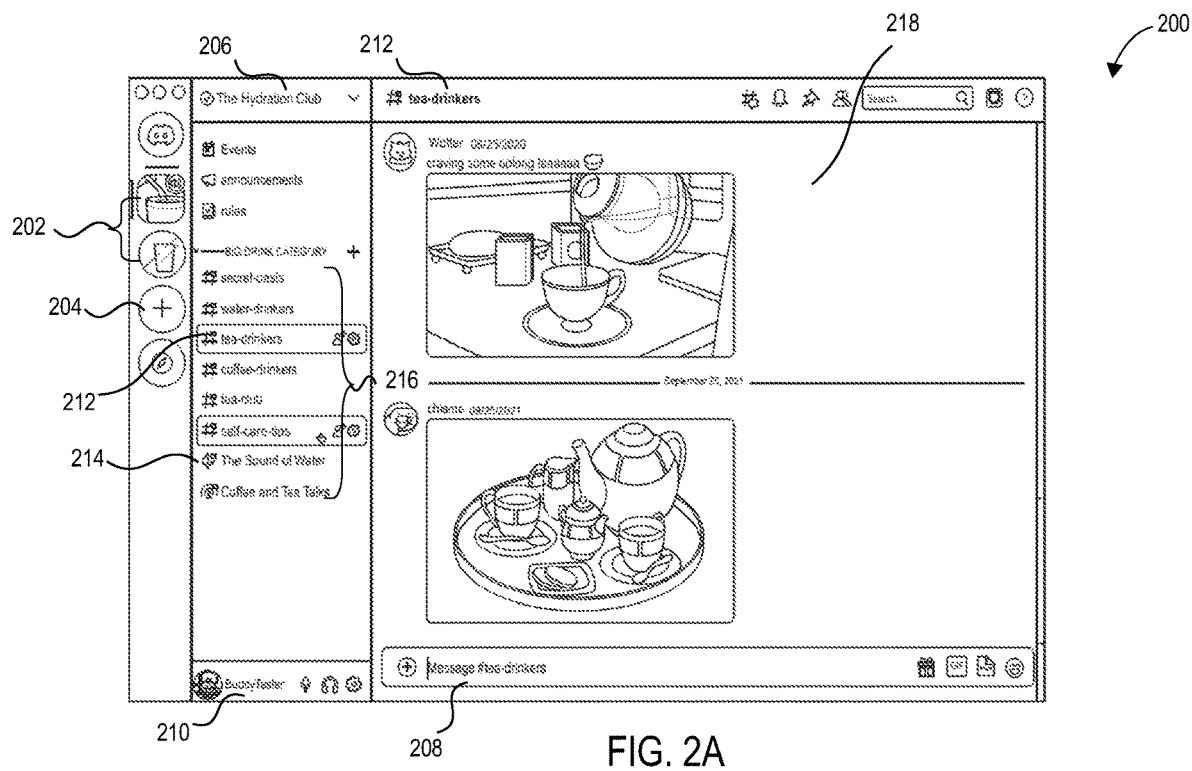
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 218 that are part of the server hydration club server. One of the channels, entitled "tea drinkers" 212 is a non-real-time messaging channel. The message thread within the "tea drinkers" 214 channel can be shown within messaging pane 220. As illustrated in FIG. 2A, the messaging pane 218 is configured to present content such as text messages, images, emojis, recorded voice or video files, attachments, etc. A user can provide content to be included in the channel using input interface 208.

User interface 200 also includes a selectable option 204 to add additional servers. User interface 200 also includes a user account icon and controls 210.

Figure 2B:
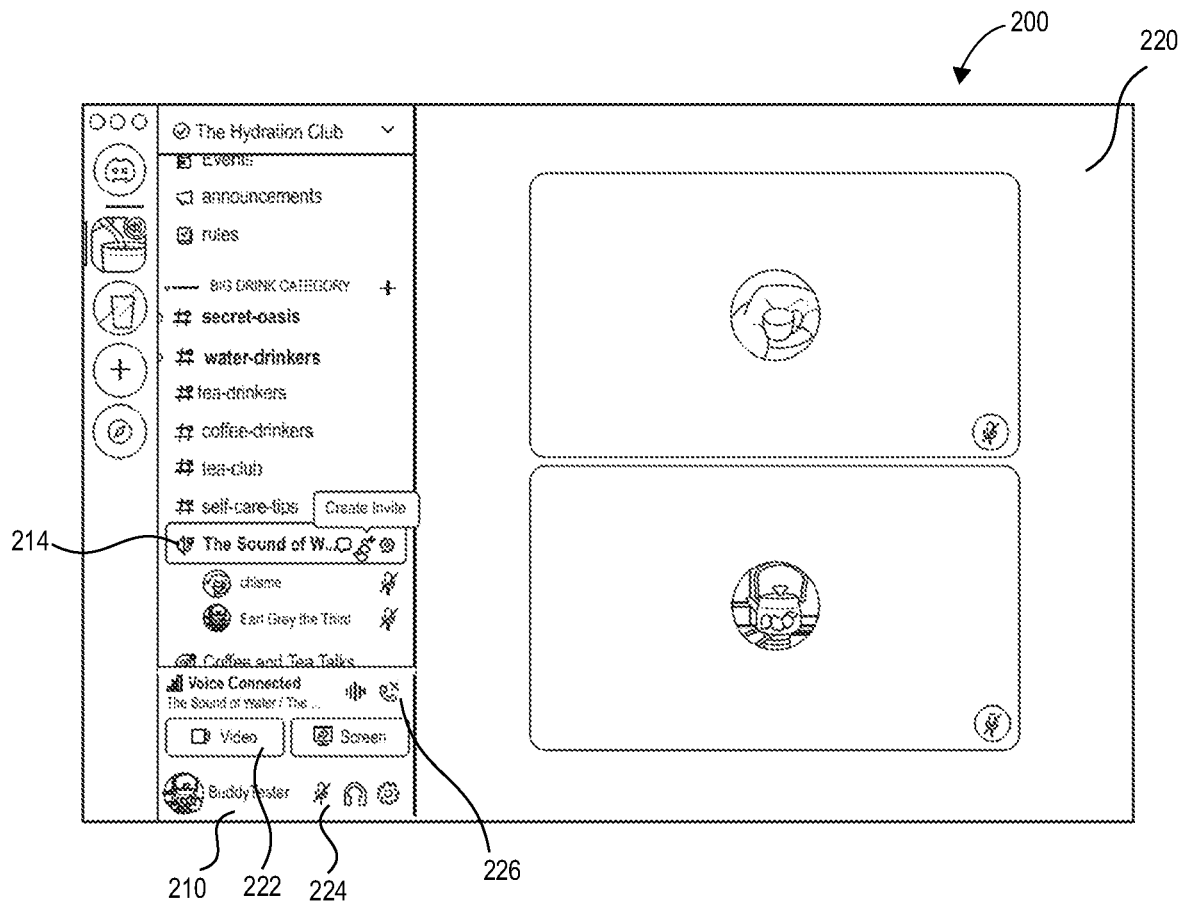
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and controls 210 show that the user accounts microphone 224 is muted. Additionally, the user account has options 222 to share their video or screen. The user account can also disconnect from the real-time communications using option 226.

Figure 3:
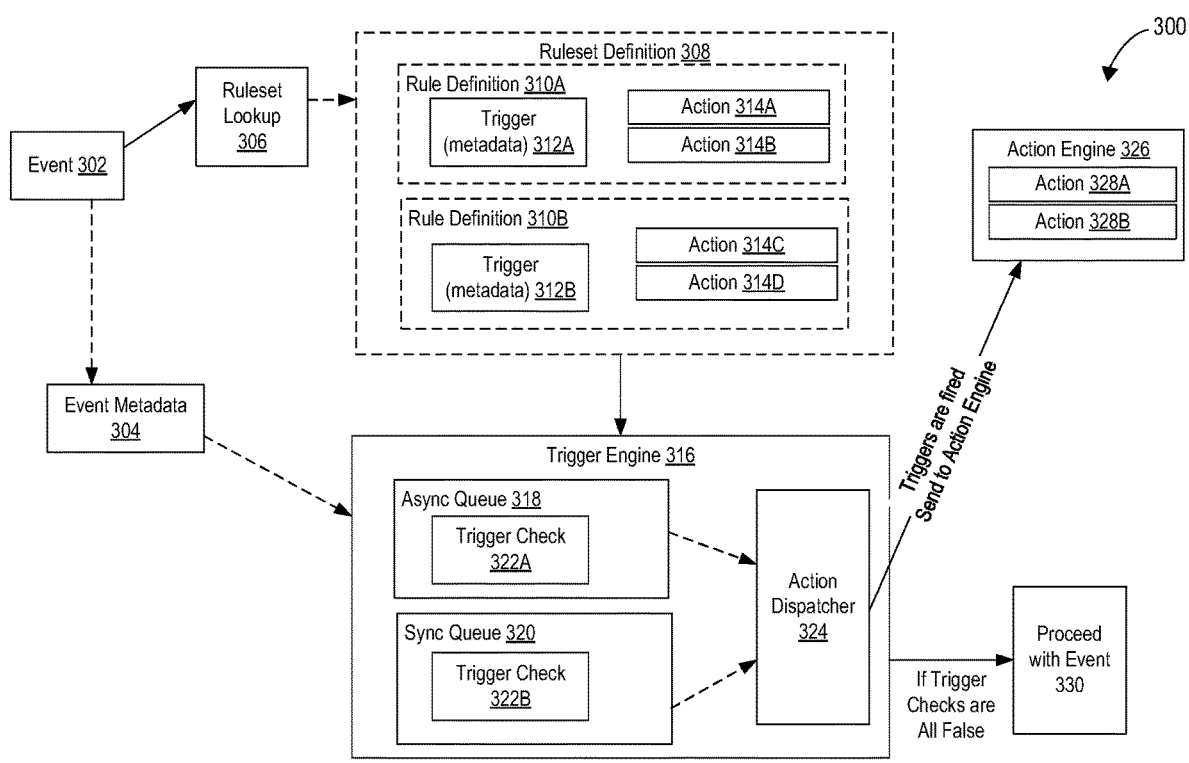
FIG. 3 illustrates an example flowchart diagram for a real-time message moderation service, according to some examples of the present disclosure.

FIG. 3 illustrates an example flowchart diagram 300 for a real-time message moderation service in accordance with some embodiments. First, an event 302 may be received and the event 302 may be generated into event metadata 304. The event 302 may be a type of user-action that would fire a trigger, such as sending a message. The event 302 may also be other kinds of events such as server joins, user profile updates, voice joins, etc.

The event 302 may be sent to a ruleset lookup 306, a ruleset being a collection of rules that pertain to a specific moderation entity or server. In other words, each server may have their own collection of rules that they have selected for their server. For example, a ruleset definition 308 for a particular example server may include two rules, a first rule definition 310A and a second rule definition 310B. The first rule definition 310A may include a trigger 312A that refers to a specific condition that resolves to be true, such as a message containing a flagged word. The first rule definition 310A may further include actions 314A, 314B that are effects of the trigger that happens when the trigger fires, such as blocking the message from sending. Similarly, the second rule definition 310B may include a trigger 312B and actions 314C, 314D.

Rule definitions may be custom rule definitions that are created by administrators for their respective servers. The admin may choose the trigger and the respective actions in defining a custom rule. For example, an admin can create a custom keyword rule that blocks certain prohibited words from chat that are outside of the scope of commonly prohibited content, such as insults, slurs, sexual content, and severe profanity. In such a case, the admin could set that any offending message would get blocked from being sent and also what other actions to be performed along with blocking the message, such as also timing out the user account that sent the message for a period of time.

The example system encapsulates the state into two buckets (event metadata 304, and a ruleset definition 308), and applies this state to some logic as a part of a trigger engine 316. The trigger engine 316 may run each trigger, provide partial encapsulation of trigger logic, and return corresponding fired triggers along with their associated rule metadata. This logic might be a static check, like a word exists in text, or as complex as a neural network. The trigger engine 316 gathers all "triggers" and applies them in two queues, one asynchronous (async/non-blocking) queue 318 and one synchronous (sync/blocking) queue 320, and waits for both queues to resolve. In other words, the async queue 318 may contain a trigger check 322A and the sync queue 320 may contain a trigger check 322B that are gathered from the ruleset definition 308 associated with a respective server.

Some trigger checks are in the async queue 318 to reduce the amount of total time it takes to run the checks while others need to run in the sync queue 320. Trigger checks that run based on processing performed by other services may best utilize async calls such that executing the other triggers does not need to wait for its completion. Based on system or threading constraints, some trigger checks may be performed synchronously on the single main thread. Once the trigger checks 322A, 322B have determined whether certain conditions have been met, respective actions can be dispatched by an action dispatcher 324. The trigger engine 316 may pass any fired triggers and their corresponding actions to an action engine 326 that chooses which actions to fire, as there may be duplicates, and/or actions that have more severe consequences. The action engine 326 may then fire off respective actions 328A, 328B. If all trigger checks are returned as false, then the event 302 proceeds, such as sending the message to the other members of the server.

Significantly, this process allows messages to be blocked in-flight in near real-time, avoiding sending out notifications to users. This is important to product adoption because users seeing notifications of spam messages are potentially higher harm than the messages themselves. Most other considered moderation approaches will either queue a message to be checked over and sent, or delete a message, but the notification might still exist. For real-time messages, in some cases, the system has to execute reliably under 40 milliseconds, so as to not affect the real-time feel of the chat system.

Figure 4:
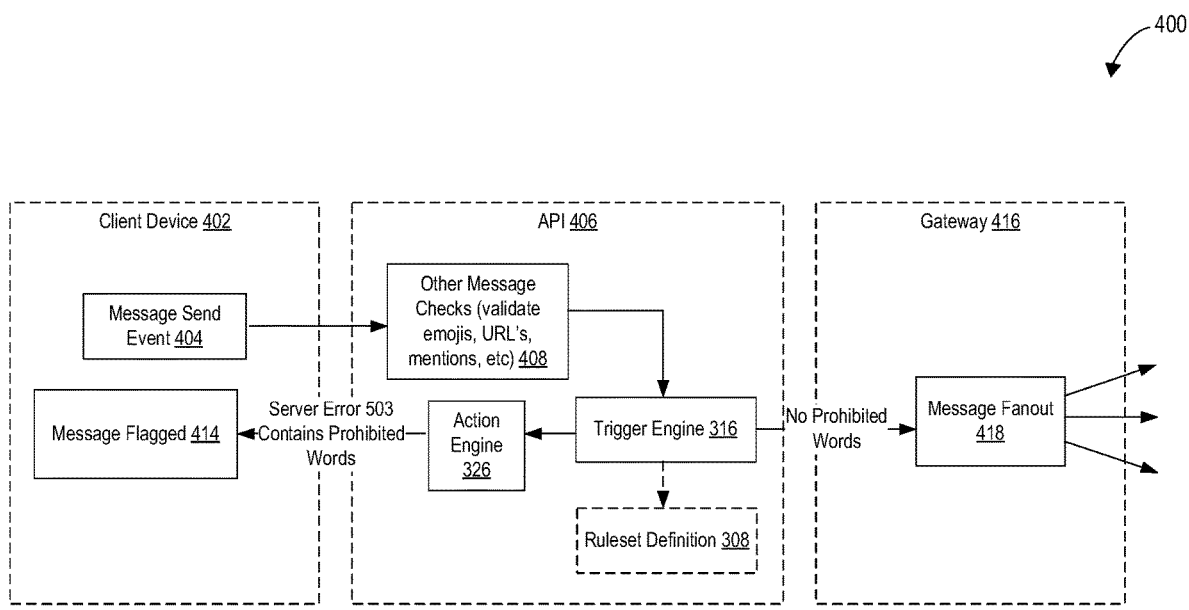
FIG. 4 illustrates an example of a partial system architecture for a real-time message moderation service in accordance with one embodiment.

FIG. 4 illustrates an example of a partial system architecture 400 for a real-time message moderation service, according to some examples of the present disclosure. From a client device 402, a message send event 404 is received at an application programming interface (API). Other message checks 408 are performed on the message. For example, any emoji's, URL's, and/or mentions in the message may be validated. Then, the message may be checked at the trigger engine 316, similar to the process depicted in FIG. 3. If there is prohibited content in the message, the action engine 326 may fire a "Server Error 503 Contains Flagged Words" message and the message may be flagged (414) at the client device 402. If there is no prohibited content, then the message may fan out (418) at a gateway 416 to other client devices associated with other members of the server.

Figure 5:
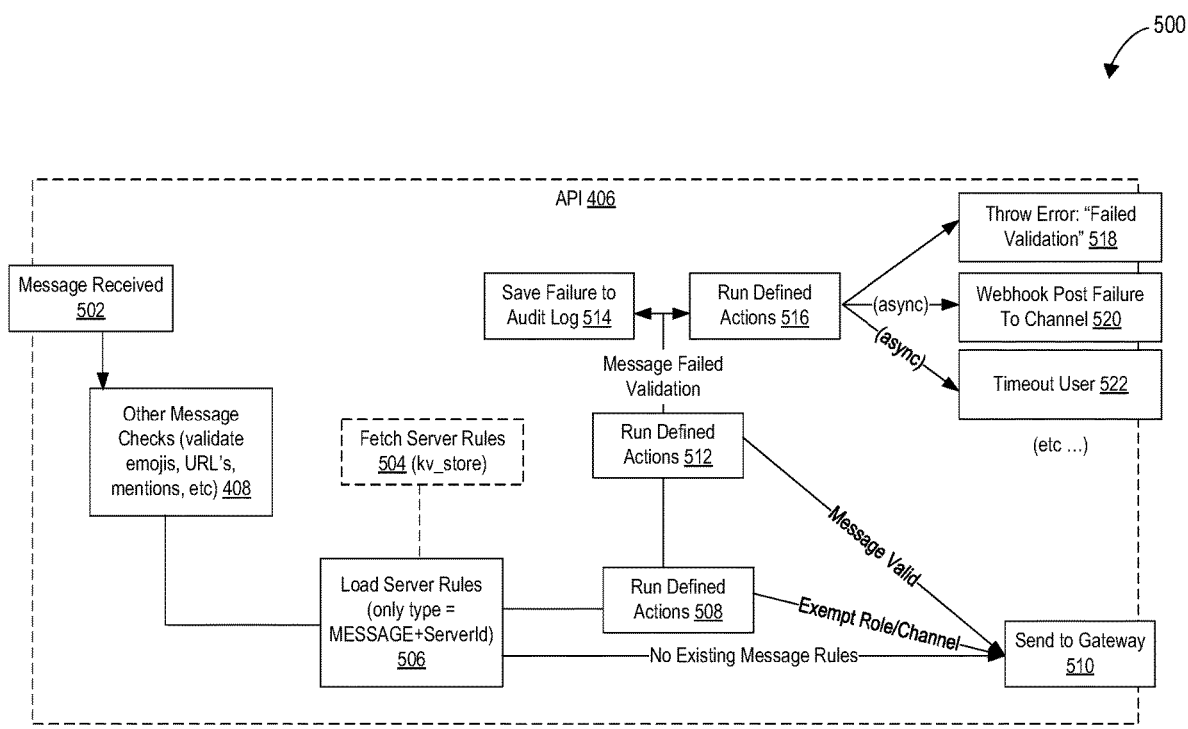
FIG. 5 illustrates an example flowchart diagram at an application programming interface (API) for a real-time message moderating service in accordance with one embodiment.

FIG. 5 illustrates an example flowchart diagram 500 at an application programming interface (API) for a real-time message moderating service, according to some examples of the present disclosure. The flowchart diagram 500 illustrates a more detailed depiction of the process at the API 406.

When a message is received (502) at the API 406, similar to the process depicted in FIG. 4, other message checks 408 may be performed on the message. Then, rules associated with a particular server are fetched (504) and loaded (506) in the trigger engine 316 (not shown in FIG. 5). In response to which defined actions are triggered based on the rules, respective triggered defined actions may run. If no rules apply, the message may be sent straight to the gateway (510). For example, one of the defined actions 508 could be to exempt certain roles and channels from the rule such that if the message comes from a user having a particular role, such as an admin, or the message is in a particular channel, then the message is sent to the gateway (510) for fan out to other client devices. As another example, another defined action 512 could be that the message does not fail any rules and the message is valid to be sent to the gateway (510).

When the message does fail validation from one or more of the rules, the failure may be saved in an audit log (514) and one or more of the respective actions may be performed. For example, "Failed validation" may be displayed as an error (518), a webhook post failure may be sent to the respective channel (520), and/or the user that sent the message may be timed out (522). Some of the actions, such as the webhook post failure to the channel (520) and the user timeout (522) may be asynchronously performed.

FIG. 6A illustrates an example of a user interface 600 presenting a custom rule generation interface in accordance with one embodiment. The user interface 600 displays text fields for entering a custom rule name and associated custom keywords that would trigger blocking messages that contain any of the keywords or associated wildcards of the keyword (i.e., sandwich* includes sandwiches), and a selection of one or more responses when a message contains any keyword. The response may be to block the message, send an alert to a custom channel viewable by administrators, and/or timing out the user. In addition, channels and/or particular administrators may be exempted from the rule.

Figure 6B:
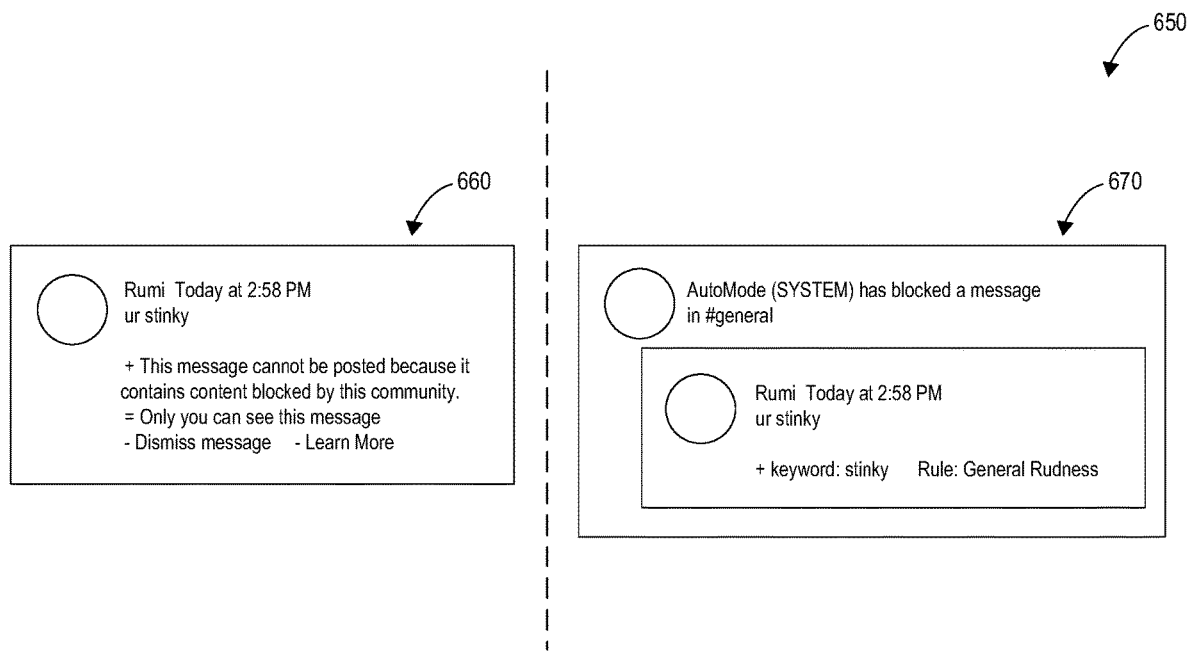
FIG. 6B illustrates an example of user interfaces presenting two types of notices in response to a blocked message in accordance with one embodiment.

FIG. 6B illustrates an example of user interfaces 650 presenting two types of notices in response to a blocked message in accordance with one embodiment. A first user interface 660 illustrates that when a message is blocked, the user that attempted to send the blocked message would receive an appended message to their blocked message that only they can see. The appended message indicates that the message cannot be posted because it contains content blocked by the respective community. On the other hand, in a second user interface 670, the administrator would see the message in addition to a different appended message that includes the keyword that triggered the blocking of the message.

Figure 7:
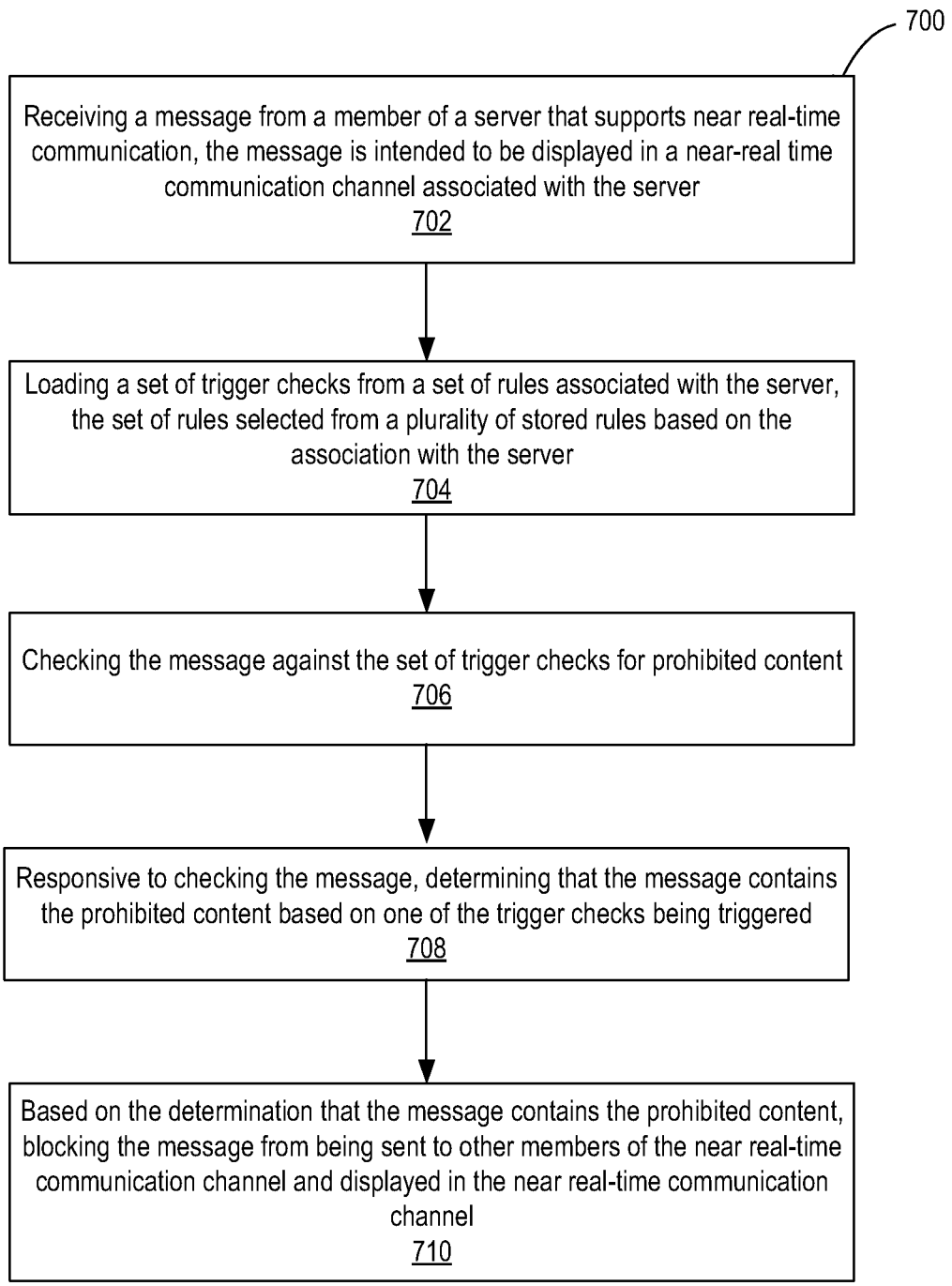
FIG. 7 illustrates an example flowchart for real-time message moderation, according to some examples of the present disclosure in accordance with one embodiment.

FIG. 7 illustrates an example method 700 for real-time message moderation, according to some examples of the present disclosure. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method 700 includes receiving a message from a member of a server that supports near real-time communication at block 702. The message may be intended to be displayed in a near real-time communication channel associated with the server. For example, a real-time communications service 108 and/or the API layer 110, an example of which is illustrated in FIG. 1, may receive the message from the member of the server. In some cases, the message may be text-based messages, voice-based messages, and/or picture-based messages.

According to some examples, the method 700 includes loading a set of trigger checks from a set of rules associated with the server at block 704. For example, the API layer 110, an example of which is illustrated in FIG. 1, may load the set of trigger checks. In some cases, the set of rules is selected from a plurality of stored rules based on the association with the server. Some servers may be associated with a default set of rules while others may have custom rules and/or trigger checks that are unique or specific to that server. As such, administrators (or moderators) may choose what is permissible in their respective servers and an ability to customize rules that align with their community guidelines is important. For example, administrators may customize the keywords to be checked, whether there is a role exclusion such that messages from administrators will not be checked against the custom rule, or whether the member would be timed out for having prohibited content in their messages.

According to some examples, the method 700 includes checking the message against the set of trigger checks for prohibited content, at block 706. For example, the API layer 110, an example of which is illustrated in FIG. 1, may check the message against the set of trigger checks.

In some cases, checking that the message contains the prohibited content is performed by a separate flow of execution or a thread, responsible for approving the message to be displayed in the near real-time communication channel. Furthermore, at least one of the trigger checks may be checked synchronously and/or asynchronously and the thread evaluates the message against at least one of the trigger checks.

In some cases, the trigger check is keyword filtering to check for regular expressions and/or a particular prohibited keyword. In determining whether the prohibited keyword is in the message, wildcards are supported such that if "park" is the prohibited keyword, that "parks" and "parking" would also be prohibited having "park" with an added suffix. However, there may be exceptions because "Parkinson's" should not be included as a prohibited word in this case. As such, exceptions may be integrated into the trigger checks or may later be added by the administrator, which will be discussed later.

In some cases, one of the trigger checks may comprise running text normalization on the message that generates at least two strings of text. For example, the message may be in Unicode characters and letters may be mapped into one or more other letters based on similarity in shape. One example is that may be mapped to "ae" or just "a" or "e", another example may be that "1" (one) may be mapped to "l" (L). Then, based on the various mappings, the original message being "æria list" may also generate "aerialist" has another string. Furthermore, some Unicode letters are not visible and are used to get around rules against prohibited words. Therefore, in some cases, those Unicode letters may be stripped, ultimately resulting in a smaller space of Unicode characters. Then, at least two strings of texts may be checked against the set of trigger checks.

As mentioned above, in some cases, some of the one or more trigger checks are handled in a single thread. The trigger checks, such as text normalization and keyword filtering, that are handled in the thread are processed synchronously. Other trigger checks require an external service request to other services, such as a machine-learning model service or a phishing filter service. The trigger checks that require the external service request may be processed asynchronously to the synchronous process to save overall processing time. As such, in some cases, the message may be passed to a machine-learning model service or a phishing filter service that filters for phishing links. The machine-learning model service may filter for spam or may be used to determine custom trigger checks. While waiting for external service requests from the machine-learning model service or the phishing filter service to return, the thread that processes synchronously may be running in parallel. The machine-learning models need to fit their processing speeds to be within a short execution window, such as approximately 40 milliseconds, for it to feel like a real-time communication.

According to some examples, the method 700 includes, responsive to checking the message, determining that the message contains the prohibited content based on one of the trigger checks being triggered at block 708. For example, the API layer 110, an example of which is illustrated in FIG. 1, may determine that the message contains prohibited content. The determination that the message failed one of the trigger checks may trigger dispatching of actions associated with the failed trigger check. The dispatched actions may include blocking the message from sending and sending an error message and/or timing out the user from posting in the server for a period of time.

In some cases, a set of actions to be performed is determined based on an association between the triggered trigger check and the set of actions set by a respective rule of the set of rules. For example, a rule may be that all message containing "meat" should be blocked and the user is to be timed-out for an hour. When a message containing the word "meat" is received, the trigger check for a keyword search for "meat" may be triggered and the associated actions in the respective rule, such as blocking and timing out, may be dispatched to an action engine for processing.

According to some examples, the method 700 includes blocking the message from being sent to other members of the near-real-time communication channel and displayed in the channel based on the determination that the message contains the prohibited content at block 710. For example, the API layer 110, an example of which is illustrated in FIG. 1, may block the message from being sent to the other members. The blocking may be one of the actions in the set of actions. In some cases, the message may be presented with an appended message, both only visible to the member, with the appended message indicating that the message has been blocked.

In some cases, the assumed prohibited content may have been a false positive. In such a case, the administrator may report the issue. For custom rules, for example, a new and separate channel may be created that is only visible to administrators in the server. The administrators may receive notifications through the channel for any instance where members sent messages with allegedly prohibited content. In the channel, the administrators may have access to the context of the message to determine whether or not the message should have been blocked. When the administrators decide that the message should not have been blocked, the administrators may report an issue and a decision may be sent to a machine-learning model that labels the decision as a bad flag to train the machine-learning model.

In some cases, when a message does not contain any prohibited content, the message may be sent to be displayed in the channel. In some cases, the user may edit the message and when the user attempts to edit the message, the edited message may be checked against the trigger checks. When the edited message contains prohibited content, the previously sent message may be appended with a message and the message is not edited in the channel. The appended message may indicate that the message has been reverted.

Figure 8:
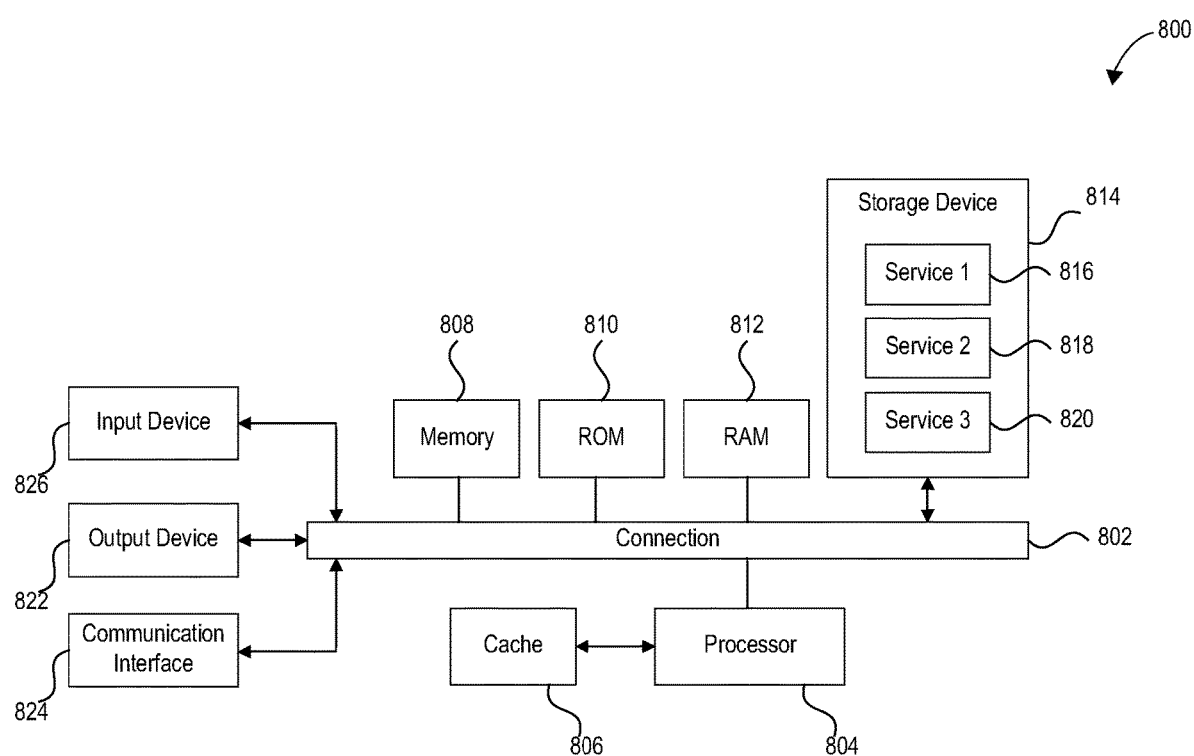
FIG. 8 shows an example of a system for implementing certain aspects of the present technology.

FIG. 8 shows an example of computing system 800, which can be for example any computing device making up client application 104, community hosting service 102, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random access memory (RAM) 812 to processor 804. Computing system 800 can include a cache of high-speed memory 806 connected directly with, in close proximity to, or integrated as part of processor 804.

Processor 804 can include any general purpose processor and a hardware service or software service, such as services 816, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A computer-implemented method, comprising: receiving a message from a member of a server that supports near real-time communications, the message is intended to be displayed in a near real-time communication channel associated with the server; loading a set of trigger checks from a set of rules associated with the server, the set of rules selected from a plurality of stored rules based on the association with the server; checking the message against the set of trigger checks for prohibited content; responsive to checking the message, determining that the message contains the prohibited content based on one of the trigger checks being triggered; and based on the determination that the message contains the prohibited content, blocking the message from being sent to other members of the near real-time communication channel and displayed in the near real-time communication channel.

Aspect 2. The computer-implemented method of Aspect 1, wherein at least one rule of the set of rules and respective one or more trigger checks are specific to the server.

Aspect 3. The computer-implemented method of Aspect 1-2 further comprising: determining a set of actions to perform based on an association between the triggered trigger check and the set of actions set by a respective rule of the set of rules, wherein the blocking is one of the actions.

Aspect 4. The computer-implemented method of Aspect 1-3, wherein the checking that the message contains the prohibited content is performed by a first thread responsible for approving the message to be displayed in the near real-time communication channel, wherein at least one of the trigger checks is checked asynchronously and at least one of the trigger checks is synchronously and the first thread evaluates the message against at least one of the trigger checks.

Aspect 5. The computer-implemented method of Aspect 1-4, further comprising: loading the set of rules in a trigger engine for checking the message against the trigger checks associated with the set of rules.

Aspect 6. The computer-implemented method of Aspect 1-5, wherein one of the trigger checks comprises: running text normalization on the message that generates at least two strings of text; and checking the at least two strings of text against the set of trigger checks.

Aspect 7. The computer-implemented method of Aspect 1-6, further comprising: timing out the member from posting on the near real-time communication channel for a period of time after the message is determined to contain the prohibited content.

Aspect 8. The computer-implemented method of Aspect 1-7, wherein at least a portion of the trigger checks are handled in a first thread, and the computer-implemented method further comprises: sending the message in external service requests to a machine-learning model service or a phishing filter service that filters for phishing links; and while waiting for responses from the external service requests from the machine-learning model service or the phishing filter service to return, continue processing the first thread synchronously.

Aspect 9. The computer-implemented method of Aspect 1-8, further comprising: receiving a custom rule including at least one of: a custom prohibited keyword, whether there is a role exclusion such that messages from administrators will not be checked against the custom rule, or whether the member would be timed out for using the custom prohibited keyword.

Aspect 10. The computer-implemented method of Aspect 1-9, further comprising: creating a separate channel for the administrator to receive a notification indicating that a member used the custom prohibited keyword that led to the message being blocked and providing context of the message; receiving a report of an issue from the administrator, the issue pertaining to incorrectly blocking a particular message based on the custom rule; and sending a decision associated with blocking the particular message to a machine-learning model and labeling the decision as a bad flag to train the machine-learning model.

Aspect 11. The computer-implemented method of Aspect 1-10, further comprising: receiving a second message from the member of the server; checking the message against the set of trigger checks; determining that the message does not contain any prohibited content; and based on the determination, sending the message to be displayed in the channel.

Aspect 12. The computer-implemented method of Aspect 1-11, further comprising: receiving an edit to the message; checking the edited message against the set of trigger checks; determining that the edited message does contain one or more triggers; and presenting the sent message with an appended message to the member without sending the edited message to be displayed in the channel, the appended message indicating that the edited message has been reverted to a previous state.

Aspect 13. A non-transitory computer-readable medium comprising instructions, the instructions, when executed by a computing system, causes the computing system to: receive a message from a member of a server that supports near real-time communications, the message is intended to be displayed in a near real-time communication channel associated with the server; load a set of trigger checks from a set of rules associated with the server, the set of rules selected from a plurality of stored rules based on the association with the server; check the message against the set of trigger checks for prohibited content; responsive to checking the message, determine that the message contains the prohibited content based on one of the trigger checks being triggered; and based on the determination that the message contains the prohibited content, block the message from being sent to other members of the near real-time communication channel and displayed in the near real-time communication channel.

Aspect 14. The non-transitory computer-readable medium of Aspect 13, wherein at least one rule of the set of rules and respective one or more trigger checks are specific to the server.

Aspect 15. The non-transitory computer-readable medium of Aspect 13-14, wherein the instructions, when executed by the computing system, causes the computing system to: determine a set of actions to perform based on an association between the triggered trigger check and the set of actions set by a respective rule of the set of rules, wherein the blocking is one of the actions.

Aspect 16. The non-transitory computer-readable medium of Aspect 13-15, wherein the checking that the message contains the prohibited content is performed by a first thread responsible for approving the message to be displayed in the near real-time communication channel, wherein at least one of the trigger checks is checked asynchronously and at least one of the trigger checks is synchronously and the first thread evaluates the message against at least one of the trigger checks.

Aspect 17. The non-transitory computer-readable medium of Aspect 13-16, wherein the instructions, when executed by the computing system, causes the computing system to: load the set of rules in a trigger engine for checking the message against the trigger checks associated with the set of rules.

Aspect 18. The non-transitory computer-readable medium of Aspect 13-17, wherein one of the trigger checks comprises: running text normalization on the message that generates at least two strings of text; and checking the at least two strings of text against the set of trigger checks.

Aspect 19. A system comprising: one or more processors; and a non-transitory computer-readable medium comprising instructions, the instructions, when executed by the one or more processors, causes the one or more processors to: receive a message from a member of a server that supports near real-time communications, the message is intended to be displayed in a near real-time communication channel associated with the server; load a set of trigger checks from a set of rules associated with the server, the set of rules selected from a plurality of stored rules based on the association with the server; check the message against the set of trigger checks for prohibited content; responsive to checking the message, determine that the message contains the prohibited content based on one of the trigger checks being triggered; and based on the determination that the message contains the prohibited content, block the message from being sent to other members of the near real-time communication channel and displayed in the near real-time communication channel.

Aspect 20. The system of Aspect 19, wherein the instructions, when executed by the one or more processors, causes the one or more processors to: determine a set of actions to perform based on an association between the triggered trigger check and the set of actions set by a respective rule of the set of rules, wherein the blocking is one of the actions.

What is claimed is:

1. A computer-implemented method, comprising:
receiving a message from a member of a server that supports near real-time communications, the message is intended to be displayed in a near real-time communication channel associated with the server;
loading a set of trigger checks from a set of rules associated with the server, the set of rules selected from a plurality of stored rules based on the association with the server;
splitting, based on a set of instructions, the set of trigger checks into an asynchronous queue and a synchronous queue, wherein the instructions require that trigger checks that require an external service request are sent to the asynchronous queue;
asynchronously checking the message against a first subset of the set of trigger checks in the asynchronous queue for prohibited content defined by the first subset, wherein the first subset requires an external service request;
synchronously checking the message against a second subset of the set of trigger checks in the synchronous queue for prohibited content defined by the first second subset, wherein the second subset is different from the first subset;
responsive to checking the message, determining that the message contains the prohibited content defined by one trigger check of the first subset of the set of trigger checks or of the second subset of the set of trigger checks being triggered; and
based on the determination that the message contains the prohibited content defined by one trigger check of the first subset of the set of trigger checks or of the second subset of the set of trigger checks being triggered, blocking the message from being sent to other members of the near real-time communication channel and displayed in the near real-time communication channel.

2. The computer-implemented method of claim 1, wherein at least one rule of the set of rules and respective one or more trigger checks are specific to the server.

3. The computer-implemented method of claim 1, further comprising:
determining a set of actions to perform based on an association between the triggered trigger check and the set of actions set by a respective rule of the set of rules, wherein the blocking is one of the actions.

4. The computer-implemented method of claim 1, wherein the checking that the message contains the prohibited content defined by one trigger check of the first subset of the set of trigger checks or of the second subset of the set of trigger checks being triggered is performed by a first thread responsible for approving the message to be displayed in the near real-time communication channel.

5. The computer-implemented method of claim 1, further comprising:
loading the set of rules in a trigger engine for checking the message against the set of trigger checks associated with the set of rules.

6. The computer-implemented method of claim 1, wherein one trigger check of the first subset of the set of trigger checks or of the second subset of the set of trigger checks comprises:

running text normalization on the message that generates at least two strings of text; and checking the at least two strings of text against the set of trigger checks.

7. The computer-implemented method of claim 1, further comprising:

timing out the member from posting on the near real-time communication channel for a period of time after the message is determined to contain the prohibited content defined by one trigger check of the first subset of the set of trigger checks or of the second subset of the set of trigger checks being triggered.

8. The computer-implemented method of claim 1, wherein at least a portion of the set of trigger checks are handled in a first thread, and the computer-implemented method further comprises:

sending the message in external service requests to a machine-learning model service or a phishing filter service that filters for phishing links; and while waiting for responses from the external service requests from the machine-learning model service or the phishing filter service to return, continue processing the first thread synchronously.

9. The computer-implemented method of claim 1, further comprising:

receiving a custom rule including at least one of: a custom prohibited keyword, whether there is a role exclusion such that messages from administrators will not be checked against the custom rule, or whether the member would be timed out for using the custom prohibited keyword.

10. The computer-implemented method of claim 9, further comprising:

creating a separate channel for one of the adminstrators to receive a notification indicating that a member used the custom prohibited keyword that led to the message being blocked and providing context of the message;

receiving a report of an issue from the one of the administrators, the issue pertaining to incorrectly blocking a particular message based on the custom rule; and sending a decision associated with blocking the particular message to a machine-learning model and labeling the decision as a bad flag to train the machine-learning model.

11. The computer-implemented method of claim 1, further comprising:

receiving a second message from the member of the server;

checking the second message against the set of trigger checks;

determining that the second message does not contain any prohibited content; and based on the determination, sending the second message to be displayed in the channel.

12. The computer-implemented method of claim 11, further comprising:

receiving an edit to the second message;

checking the edited second message against the set of trigger checks;

determining that the edited second message does contain one or more triggers; and presenting the edited second message with an appended message to the member without sending the edited second message to be displayed in the channel, the appended message indicating that the edited second message has been reverted to a previous state.

13. A non-transitory computer-readable medium comprising instructions, the instructions, when executed by a computing system, causes the computing system to:

receive a message from a member of a server that supports near real-time communications, the message is intended to be displayed in a near real-time communication channel associated with the server;

load a set of trigger checks from a set of rules associated with the server, the set of rules selected from a plurality of stored rules based on the association with the server, wherein the set of trigger checks includes a first subset of trigger checks that utilize an external service and a second subset of trigger checks;

split, based on a set of instructions, the set of trigger checks into an asynchronous queue and a synchronous queue, wherein the instructions require that trigger checks that require an external service request are sent to the asynchronous queue;

asynchronously check the message against the first subset of the set of trigger checks for prohibited content defined by the first subset, wherein the first subset requires an external service request;

synchronously check the message against the second subset of the set of trigger checks for prohibited content defined by second subset, wherein the second subset is different from the first subset;

responsive to checking the message, determine that the message contains the prohibited content defined by one trigger check of the first subset of the set of trigger checks or of the second subset of the set of trigger checks being triggered; and based on the determination that the message contains the prohibited content defined by one trigger check of the first subset of the set of trigger checks or of the second subset of the set of trigger checks being triggered, blocking the message from being sent to other members of the near real-time communication channel and displayed in the near real-time communication channel.

14. The non-transitory computer-readable medium of claim 13, wherein at least one rule of the set of rules and respective one or more trigger checks are specific to the server.

15. The non-transitory computer-readable medium of claim 13, wherein the instructions, when executed by the computing system, causes the computing system to:

determine a set of actions to perform based on an association between the triggered trigger check and the set of actions set by a respective rule of the set of rules, wherein the blocking is one of the actions.

16. The non-transitory computer-readable medium of claim 13, wherein the checking that the message contains the prohibited content defined by one trigger check of the first subset of the set of trigger checks or of the second subset of the set of trigger checks being triggered is performed by a first thread responsible for approving the message to be displayed in the near real-time communication channel.

17. The non-transitory computer-readable medium of claim 13, wherein the instructions, when executed by the computing system, causes the computing system to:

load the set of rules in a trigger engine for checking the message against the set of trigger checks associated with the set of rules.

18. The non-transitory computer-readable medium of claim 13, wherein one trigger check of the first subset of the set of trigger checks or of the second subset of the set of trigger checks comprises:

running text normalization on the message that generates at least two strings of text; and checking the at least two strings of text against the set of trigger checks.

19. A system comprising:

one or more processors; and a non-transitory computer-readable medium comprising instructions, the instructions, when executed by the one or more processors, causes the one or more processors to:

receive a message from a member of a server that supports near real-time communications, the message is intended to be displayed in a near real-time communication channel associated with the server;

load a set of trigger checks from a set of rules associated with the server, the set of rules selected from a plurality of stored rules based on the association with the server, wherein the set of trigger checks includes a first subset of trigger checks that utilize an external service and a second subset of trigger checks;

split, based on a set of instructions, the set of trigger checks into an asynchronous queue and a synchronous queue, wherein the instructions require that trigger checks that require an external service request are sent to the asynchronous queue;

asynchronously check the message against the first subset of the set of trigger checks for prohibited content defined by the first subset, wherein the first subset requires an external service request;

synchronously check the message against the second subset of the set of trigger checks for prohibited content defined by the second subset, wherein the second subset is different from the first subset;

responsive to checking the message, determine that the message contains the prohibited content defined by one trigger check of the first subset of the set of trigger checks or of the second subset of the set of trigger checks being triggered; and based on the determination that the message contains the prohibited content defined by one trigger check of the first subset of the set of trigger checks or of the second subset of the set of trigger checks being triggered, blocking the message from being sent to other members of the near real-time communication channel and displayed in the near real-time communication channel.

20. The system of claim 19, wherein the instructions, when executed by the one or more processors, causes the one or more processors to:

determine a set of actions to perform based on an association between the triggered trigger check and the set of actions set by a respective rule of the set of rules, wherein the blocking is one of the actions.

* * * * *